(12) United States Patent　　　(10) Patent No.:　US 12,564,182 B2

Cunningham, Sr.　　　(45) Date of Patent:　Mar. 3, 2026

---

(54) ADAPTIVE DEVICE FOR FISHING

(71) Applicant: Lonn J. Cunningham, Sr., Winona, TX (US)

(72) Inventor: Lonn J. Cunningham, Sr., Winona, TX (US)

( * ) Notice: Subject to any disclaimer, the term of this patent is extended or adjusted under 35 U.S.C. 154(b) by 41 days.

(21) Appl. No.: 18/639,941

(22) Filed: Apr. 18, 2024

(65) Prior Publication Data

US 2025/0324961 A1　　Oct. 23, 2025

(51) Int. Cl.
A01K 97/10　　　(2006.01)

(52) U.S. Cl.
CPC ................................... A01K 97/10 (2013.01)

(58) Field of Classification Search
CPC ........ A01K 89/08; A01K 87/06; A01K 87/08;
A01K 87/00; A01K 87/008; A01K
87/009; A01K 97/10
See application file for complete search history.

(56) References Cited

U.S. PATENT DOCUMENTS

| | | | | | |
|---|---|---|---|---|---|
| 2,899,155 | A | * | 8/1959 | Rogers | A01K 97/10 |
| | | | | | 248/528 |
| 3,654,722 | A | * | 4/1972 | Camilleri | A01K 91/02 |
| | | | | | 43/25 |
| 3,772,816 | A | * | 11/1973 | Ridge | A01K 97/10 |
| | | | | | 43/21.2 |
| 4,156,983 | A | * | 6/1979 | Moore | A01K 87/00 |
| | | | | | 43/25 |

| | | | | | |
|---|---|---|---|---|---|
| 4,244,132 | A | * | 1/1981 | Hoffman | A01K 97/10 |
| | | | | | 43/21.2 |
| 4,461,113 | A | * | 7/1984 | Erwin | A01K 97/11 |
| | | | | | 43/15 |
| 4,486,968 | A | * | 12/1984 | Gould | A01K 97/11 |
| | | | | | 43/21.2 |
| 5,347,742 | A | * | 9/1994 | Ohmura | A01K 87/06 |
| | | | | | 43/22 |
| 5,639,057 | A | * | 6/1997 | Yeomans | E06C 7/46 |
| | | | | | 248/156 |

(Continued)

FOREIGN PATENT DOCUMENTS

| | | | | | | |
|---|---|---|---|---|---|---|
| KR | 20130106748 | A | * | 9/2013 | ............. | A01K 97/10 |
| KR | 20160120595 | A | * | 10/2016 | ............. | A01K 97/10 |

OTHER PUBLICATIONS

KR-20160120595-A Text (Year: 2016).*

(Continued)

*Primary Examiner* — Katelyn T Truong

(74) *Attorney, Agent, or Firm* — Perkins Coie LLP

(57)　　　　ABSTRACT

Various of the disclosed embodiments concern an adaptive device for fishing that has a rod support portion which is adapted to support and retain thereto a fishing rod and a reel support portion which is adapted to support and retain thereto a fishing reel. The rod and reel are mounted apart from each other. A transverse hinge joins the rod support portion and the reel support portion to effect articulated movement therebetween. The rod is configured to be raised and lowered independently of the reel to allow casting of a line while the reel is retained in a fixed position to effect casting of a fishing line when the rod portion is moved upwardly about a hinge axis raising the rod into a casting position past vertical relative to the reel and then rapidly moved downwardly to cast the line.

12 Claims, 6 Drawing Sheets

(56)           References Cited

U.S. PATENT DOCUMENTS

| | | | | |
|---|---|---|---|---|
| 5,937,567 | A * | 8/1999 | Elkins | A01K 97/10 |
| | | | | 248/538 |
| 10,609,912 | B2 * | 4/2020 | Snopkowski | A01K 91/04 |
| 2019/0223424 | A1 * | 7/2019 | Moses | A47F 7/0035 |

OTHER PUBLICATIONS

KR-20130106748-A Text (Year: 2013).*

"Adaptive Fishing Equipment", United Spinal Association, accessed on Apr. 9, 2024 at <https://spinalcord.org/disability-products-services/adaptive-fishing-equipment/>.

"Adaptive Fishing Equipment", Handi Accessories, accessed on Apr. 9, 2024 at <https://handiaccessories.com/collections/adaptive-fishing-equipment-1>.

"Adaptive fishing rod holders that will help you catch more fish", Freedom adaptive systems, accessed on Apr. 9, 2024 at <https://freedomadaptivesystems.com/products>.

"Limited Mobility Fishing Mount", Able Access to Recreation, accessed on Apr. 9, 2024 at <https://ablerec.com/limited-mobility-fishing-mount/>, 2024.

"Limited Mobility Fishing Mount", Job Accommodation Network, Adaptive Outdoors, accessed on Apr. 9, 2024 at <https://askjan.org/products/Limited-Mobility-Fishing-Mount.cfm>.

Boggs, Dan , "Understanding the Landscape: Fishing and Disabilities", Fishing and Disabilities: Adaptive Fishing Equipment—Premier Angler, accessed on Apr. 9, 2024 at <https://premierangler.com/fishing-and-disabilities-adaptive-fishing-equipment/>, Apr. 3, 2020.

Ehsan, K. M. , "Disabled Fishing Equipment for Handicap Fishing", Tetra Hook, accessed on Apr. 9, 2024 at <https://www.tetrahook.com/disabled-fishing-equipment/>, Aug. 18, 2023.

* cited by examiner

ADAPTIVE DEVICE FOR FISHING

FIELD

Various of the disclosed embodiments concern an adaptive device for fishing.

BACKGROUND

Fishing is a major recreational pastime in the United States. Each year, roughly 50-60 million Americans fish public and private waters.

What rarely gets talked about, however, is how the fishing industry fails to accommodate individuals with physical disabilities. This is unfortunate because the healing benefits of fishing are well known. It would be advantageous to provide disabled individuals with equipment that allows them to overcome their disabilities and go fishing.

SUMMARY

Various of the disclosed embodiments concern an adaptive device for fishing that has a rod support portion which is adapted to support and retain thereto a fishing rod and a reel support portion which is adapted to support and retain thereto a fishing reel. The rod and reel are mounted apart from each other. A transverse hinge joins the rod support portion and the reel support portion to effect articulated movement therebetween. The rod is configured to be raised and lowered independently of the reel to allow casting of a line while the reel is retained in a fixed position to effect casting of a fishing line when the rod portion is moved upwardly about a hinge axis raising the rod into a casting position past vertical relative to the reel and then rapidly moved downwardly to cast the line.

DETAILED DESCRIPTION

Various of the disclosed embodiments concern an adaptive device for fishing.

Figure 1:
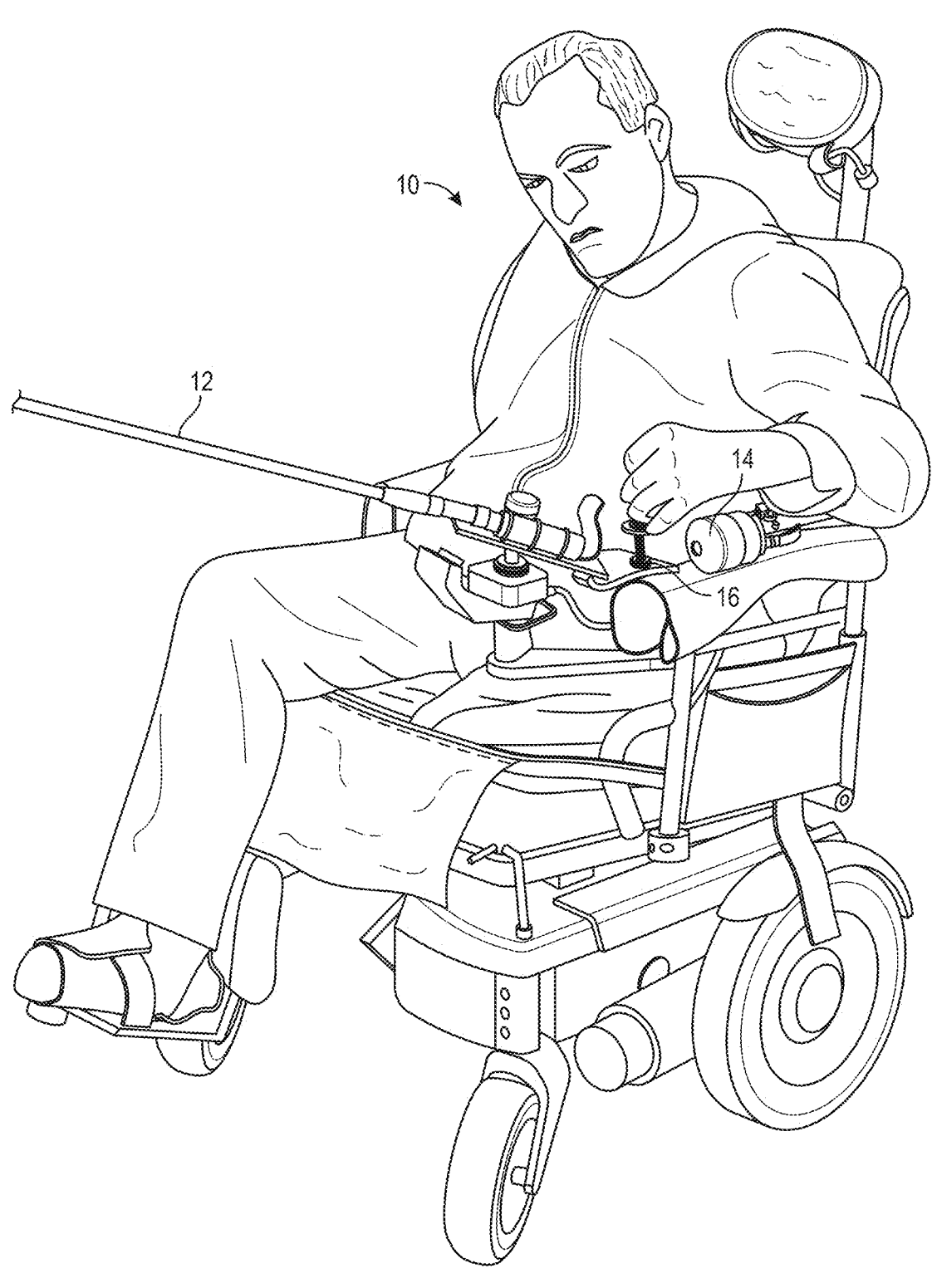
FIG. 1 is a perspective view of an adaptive device for fishing installed on a wheelchair according to the invention.

FIG. 1 is a perspective view of an adaptive device for fishing installed on a wheelchair according to the invention. In FIG. 1, a fisherman in a wheelchair 10 can fish using a rod 12 and reel 14 that are incorporated into an adaptive device 16. The fisherman is able to cast a line and reel in the line, hopefully with a fish on the hook at the end of the line, as one would normally do when fishing. Those skilled in the art will appreciate that while the adaptive device is shown attached to a wheelchair it is readily attached to any support surface including but to limited to, a railing, boat dock, stand, table, decking, etc.

Figure 2:
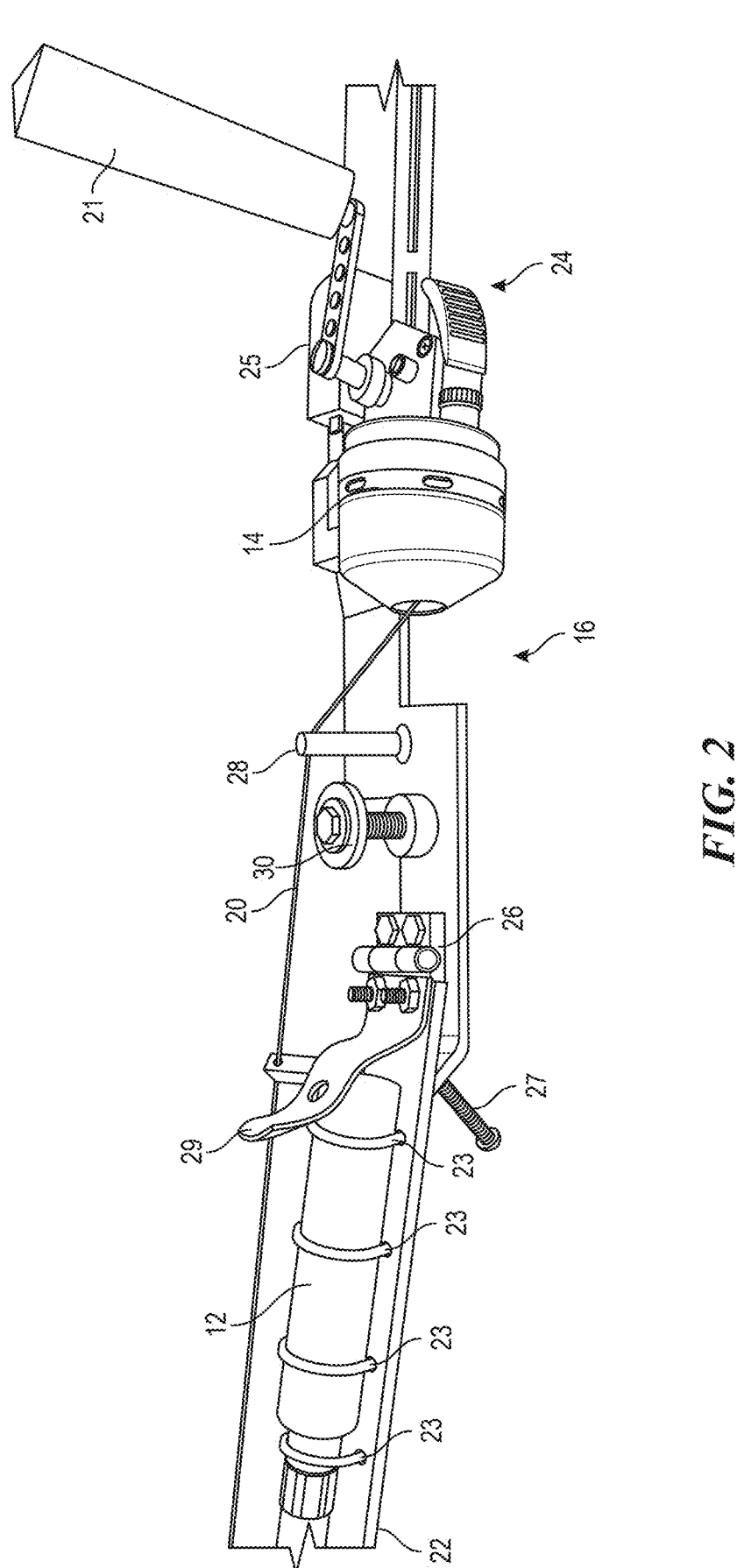
FIG. 2 is a detailed perspective view of an adaptive device for fishing according to the invention.

FIG. 2 is a detailed perspective view of an adaptive device for fishing according to the invention. In FIG. 2, the adaptive device 16 includes a fishing reel 14 and a fishing rod 12. Embodiments of the invention are adapted to accept most commercially available rods and reels. The rod and reel and shown in a somewhat coaxial relationship as is typical in a standard rod and reel arrangement. Unlike the standard arrangement for a rod and reel where the reel is affixed to the rod, in the adaptive device the rod and reel are mounted apart from each other. This allows the rod to be raised and lowered independently of the reel and thus allows casting of the line while the reel remains in a fixed position.

The adaptive device comprises a rod support portion 22 and a reel support portion 24. The choice of equipment that a fisherman using the adaptive device has is increased exponentially. The rod and reel combination that may be used in connection with the adaptive device are unlimited. The rod is secured to the rod support portion by a series of straps, tie tabs, Velcro, etc. 23 that are inserted through complementary apertures formed in the rod support portion. Those skilled in the art will appreciate that the rod may be secured with other mechanisms such as clamps, bolts, etc. The reel is secured to the reel support portion by a clamping mechanism 25. Those skilled in the art will appreciate that the rod may be secured with other mechanisms such as bolts, straps, etc.

A transverse hinge 26 joins the rod support portion to the reel support portion to provide articulated movement therebetween. Such movement effects casting of the line 20. When the rod portion is moved upwardly about a hinge axis the rod is raised past vertical relative to the reel portion into a casting position. The resting angle of the rod portion relative to the reel portion after the line is cast, while waiting for fish to bite, is adjusted by an adjustment bolt 27. To cast the line the rod portion is rapidly lowered about the hinge axis.

In embodiments of the invention a spring may be incorporated in the hinge to bias the rod downwardly to assist with the casting. As the rod is drawn upwardly downward tension increases on the rod. When the rod is then released the rod moves downward rapidly under influence of the spring and the line is cast. In other embodiments of the invention, a retention and release mechanism may be included to secure the rod in an elevated position for casting until the release is actuated. When a spring bias is included the rod is raised to a casting position and locked in that position until the fisherman decides to cast the line by pressing the release mechanism.

When the line is cast it is guided from the reel to the rod through a first guide 28, a line tension plunger 30, and a second guide 29. The line is drawn into the reel by operation of an enlarged reel handle 21.

Figure 3:
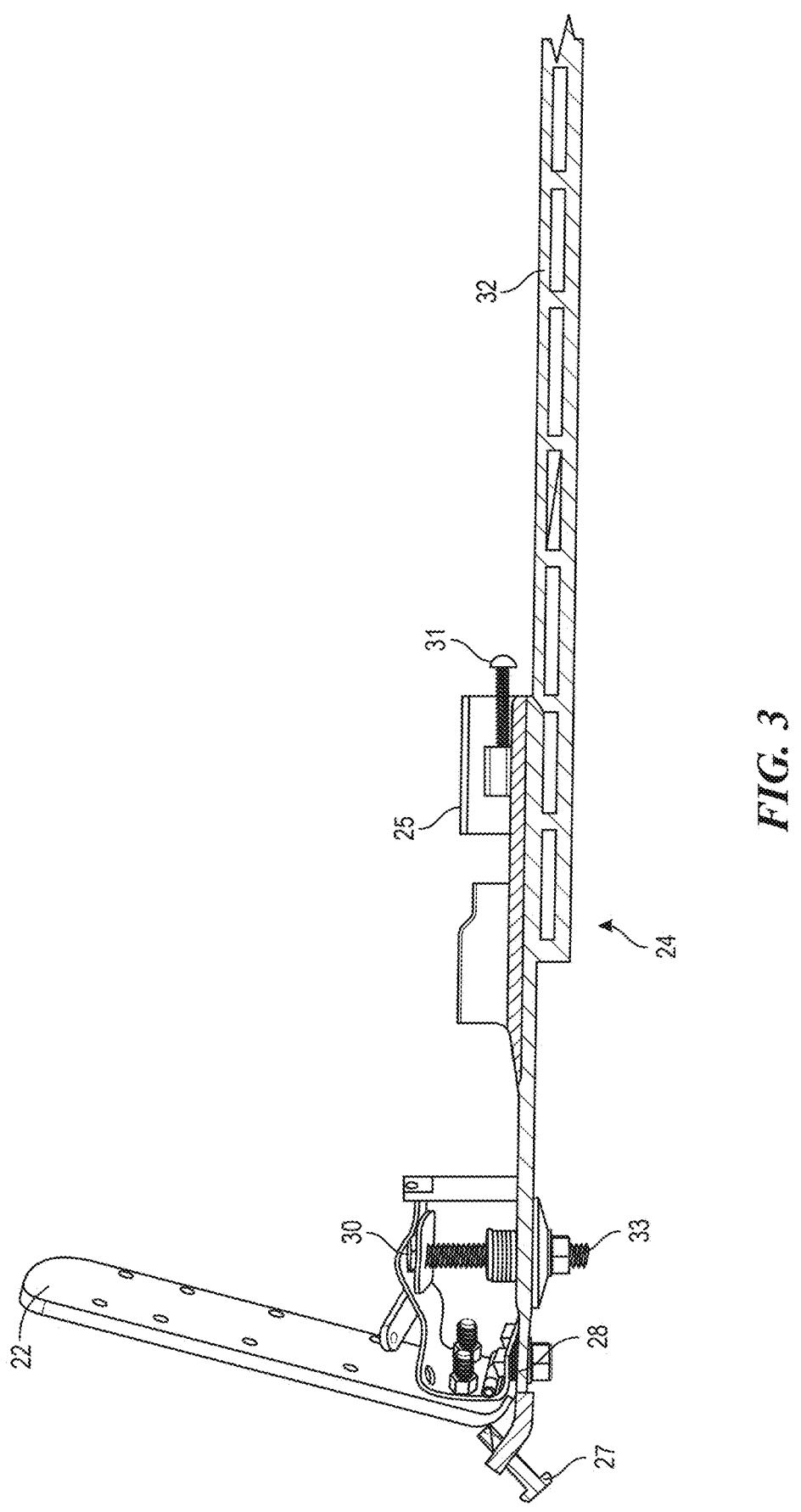
FIG. 3 is a side view of an adaptive device for fishing according to the invention.

FIG. 3 is a side view of an adaptive device for fishing according to the invention. In FIG. 3, the rod support portion 22 is shown past vertical relative to the reel support portion 24. This is the casting position. The reel support portion includes an extended base 32 with which the adaptive device is secured to a support, such as the wheelchair shown in FIG. 1. The extended base may be secured to the support by any of. for example, straps, clamps, bolts, tape, Velcro, etc. In an embodiment of the invention, the base portion is about 18 inches long but may be of any desired length. The base portion of the adaptive device can be made of aluminum. Those skilled in the art will appreciate that the adaptive device may be made of other materials, for example, steel, plastic, etc. For example, in an embodiment of the invention the line tension plunger is made of steel.

In an embodiment of the invention the reel is secured to the adaptive device in a vise-like clamping mechanism comprising a slotted base 25 and adjustable bolt 31.

As shown in FIG. 3 the tension applied by line tension plunger 30 to the line can be adjusted by an adjusting bolt 33. To adjust the line tension plunger the nut on the bolt is tightened or loosened to add or subtract tension on the line, depending on the amount of weight the fisherman is using to fish, i.e. more weight requires more tension while less weight requires less tension.

Figure 4:
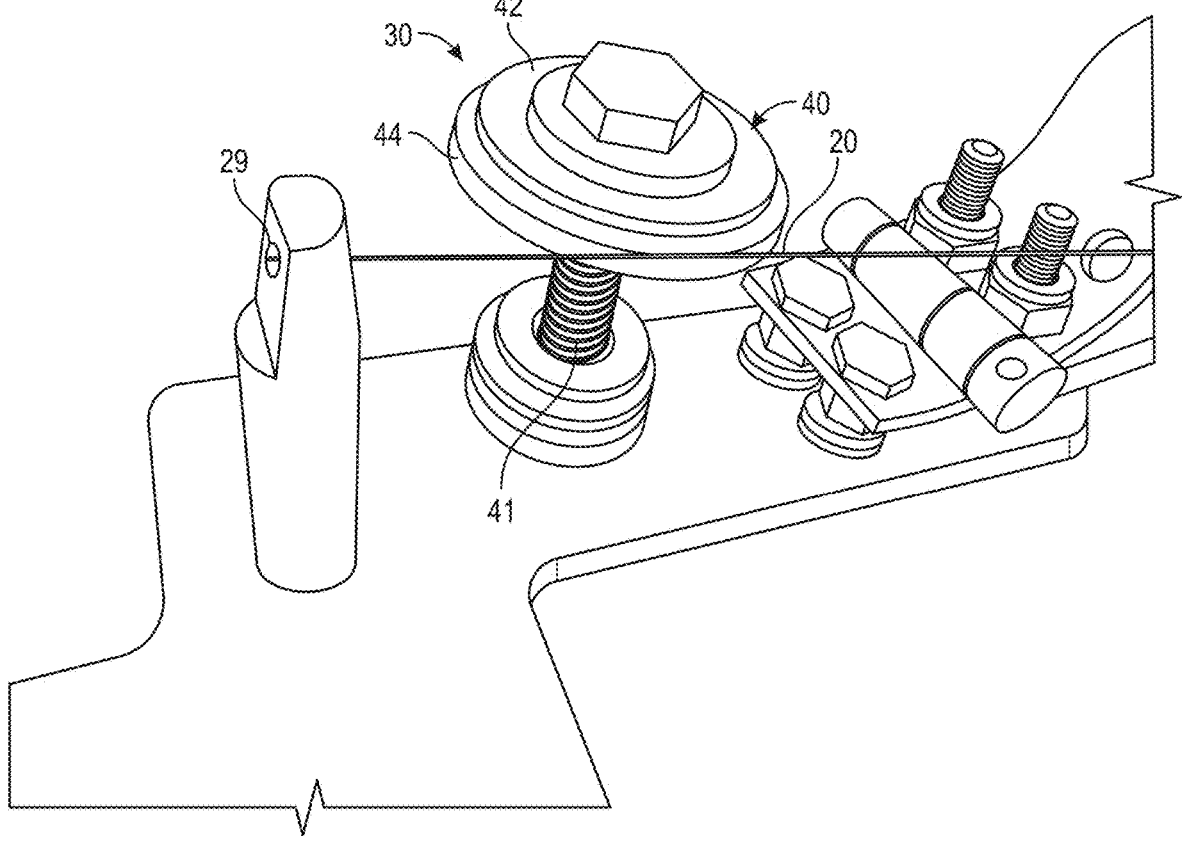
FIG. 4 is a detailed perspective view of a line tension plunger assembly for an adaptive device for fishing according to the invention.

FIG. 4 is a detailed perspective view of a line tension plunger assembly for an adaptive device for fishing according to the invention. As shown in FIG. 4, the line 20 is threaded through the guide 29. The guide serves as a pivot point that maintains the line in the axis of both the rod and the reel as the rod is raised and lowered relative to the reel during casting. Proper line tension is maintained by the line tension plunger 30 by maintaining tension on the line when the rod is elevated to a casting position and releasing tension from the line as the line is cast.

In an embodiment of the invention the line tension plunger is spring loaded 41. This provides a brake and guide surface 40 that is selectably engaged with the line during casting the line because the tension plunger clamps the line and does not allow it to slip. In embodiments of the invention the tension plunger includes two different sized rubber washers where a lower washer 44 has a larger diameter than an upper washer 42. In this way the line is readily engaged with and disengaged from the tension plunger.

Figure 5:
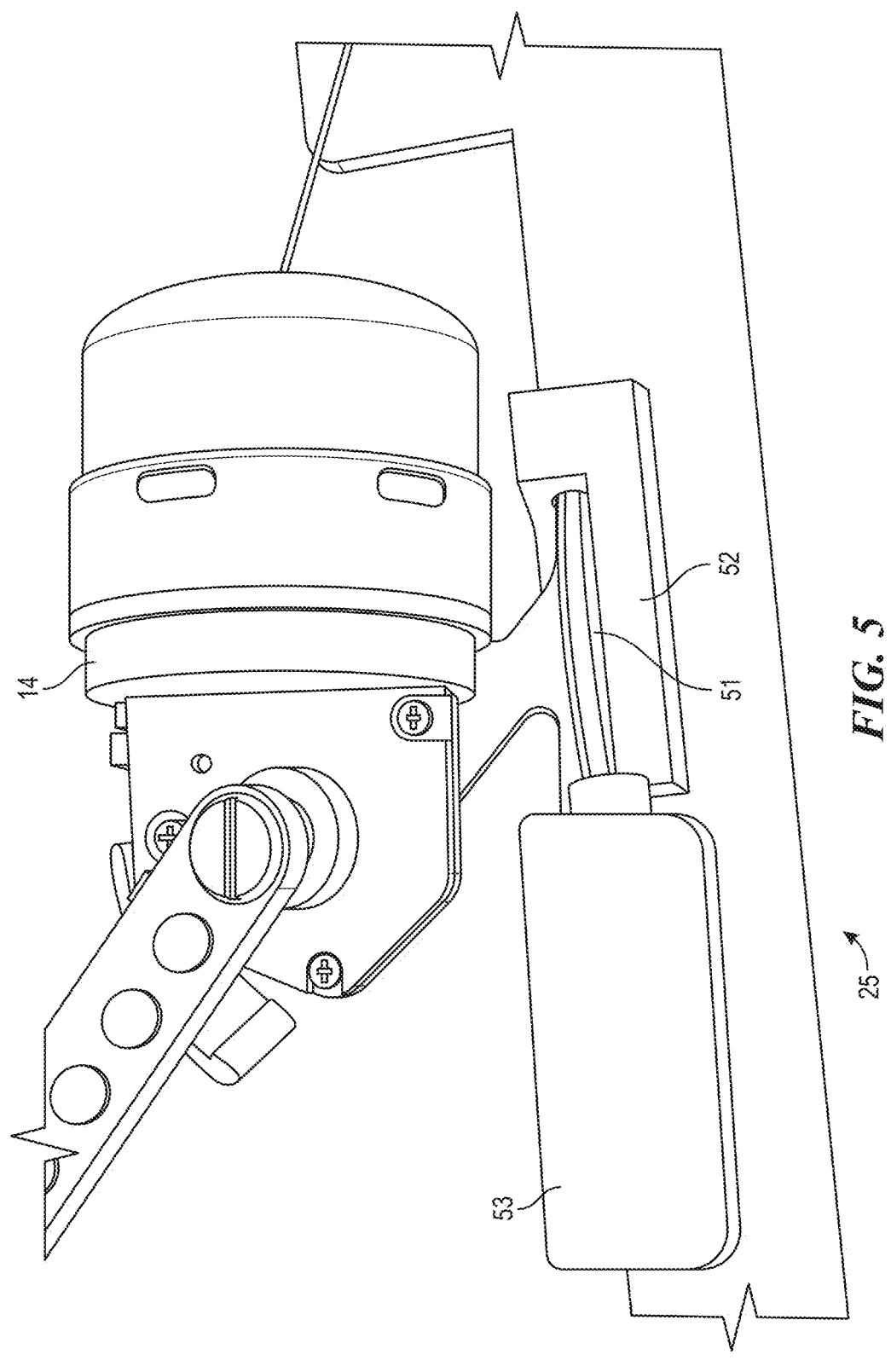
FIG. 5 is a side view of a reel mounted to an adaptive device for fishing according to the invention.

FIG. 5 is a side view of a reel mounted to an adaptive device for fishing according to the invention. In FIG. 5, the reel 14 base 51 is retained to the reel clamping assembly 25 on a mounting plate 52 with a clamp plate 53.

Figure 6:
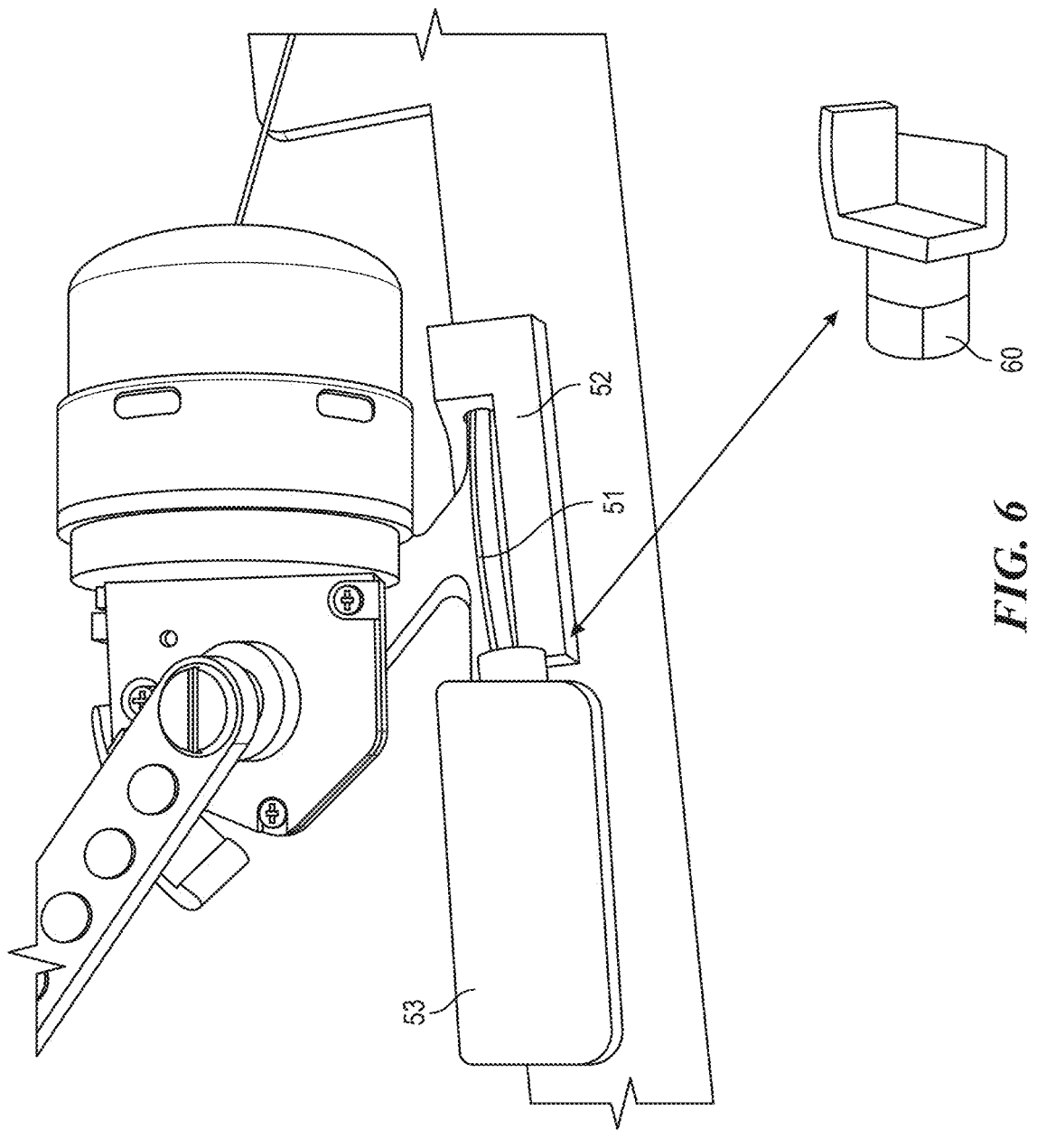
FIG. 6 is a further side view of a reel mounted to an adaptive device for fishing showing a reel retainer according to the invention.

FIG. 6 is a further side view of a reel mounted to an adaptive device for fishing showing a reel retainer according to the invention. In FIG. 6, the clamp plate 53 includes a clamp insert 60 by which the clamp plate imparts clamping tension to the reel base 51. In embodiments of the invention the clamp insert is made of a material that is both hard to maintain a constant pressure on the reel and that has a soft surface that does not mar the reel base when holding the reel to the adaptive device. In other embodiments of the invention a swivel nut may be use instead of a clamp insert.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

The invention claimed is:

1. An adaptive device for fishing, comprising:
a rod support portion adapted to support and retain thereto a fishing rod;
a reel support portion adapted to support and retain thereto a fishing reel;
wherein the rod and reel are mounted apart from each other;
a transverse hinge joining the rod support portion and the reel support portion and adapted to effect articulated movement therebetween;

wherein the rod is configured to be raised and lowered independently of the reel to allow casting of a line while the reel is retained in a fixed position to effect casting of a fishing line when the rod portion is moved upwardly about a hinge axis raising the rod into a casting position past vertical relative to the reel and then rapidly moved downwardly to cast the line,
a first guide positioned proximate to the reel, said first guide adapted to guide the line to and from the reel;
a second guide positioned proximate to the rod, said second guide adapted to guide the line to and from the rod;
a line tension plunger positioned between the first guide and the second guide, said line tension plunger adapted to provide a bearing and guide surface to maintain tension on the line when the rod is elevated to a casting position and adapted to release tension from the line as the line is cast; and
the line tension plunger comprising an adjusting bolt for adjusting tension applied by the line tension plunger to the line, the adjusting bolt extending through the reel support portion;
wherein the guide provides a pivot point that is adapted to maintain the line in an axis of both the rod and the reel as the rod is raised and lowered relative to the reel; and
the line tension plunger comprising a spring adapted to bias the line tension plunger to selectable engagement with the line.

2. The adaptive device of claim 1, the rod support portion further comprising one or more apertures formed therethrough; and further comprising:
one or more straps or tie tabs adapted for insertion through said one or more apertures to secure the rod to the rod support portion.

3. The adaptive device of claim 1, further comprising:
a clamping mechanism adapted to secure the reel to the reel support portion.

4. The adaptive device of claim 1, further comprising:
an angle adjustment bolt adapted to set a resting angle of the pole after the line is cast.

5. The adaptive device of claim 1, further comprising:
a guide adapted to guide the line from the reel to the rod when the line is cast or retracted.

6. The adaptive device of claim 1, further comprising:
an enlarged reel handle adapted to operate the reel to draw the line into the reel.

7. The adaptive device of claim 1, the reel support portion further comprising:
an extended base to secure the adaptive device to a support.

8. The adaptive device of claim 1, said reel support portion further comprising:
a clamping mechanism comprising a slotted base and adjustable bolt adapted to secure the reel thereto.

9. The adaptive device of claim 8, said clamping mechanism further comprising:
a mounting plate adapted to receive a base of the reel; and
a clamp plate adapted to hold the reel to the mounting plate.

10. The adaptive device of claim 9, said clamping mechanism further comprising:
a resilient clamp insert adapted to impart clamping tension to the reel base.

11. A method for using an adaptive device to cast a fishing line, comprising:
providing a rod support portion adapted to support and retain thereto a fishing rod;

providing a reel support portion adapted to support and retain thereto a fishing reel;

wherein the rod and reel are mounted apart from each other;

joining the rod support portion and the reel support portion with a transverse hinge adapted to effect articulated movement therebetween;

raising and lowering the rod independently of the reel during casting of a line while retaining the reel in a fixed position;

casting the fishing line by the moving rod portion upwardly about a hinge axis to raise the rod into a casting position past vertical relative to the reel and then rapidly moving the rod downwardly;

providing a first guide positioned proximate to the reel, said first guide adapted to guide the line to and from the reel;

providing a second guide positioned proximate to the rod, said second guide adapted to guide the line to and from the rod;

providing a line tension plunger positioned between the first guide and the second guide, said line tension plunger adapted to provide a bearing and guide surface to maintain tension on the line when the rod is elevated to a casting position and adapted to release tension from the line as the line is cast; and the line tension plunger comprising an adjusting bolt for adjusting tension applied by the line tension plunger to the line, the adjusting bolt extending through the reel support portion;

wherein the guide provides a pivot point that is adapted to maintain the line in an axis of both the rod and the reel as the rod is raised and lowered relative to the reel; and the line tension plunger comprising a spring adapted to bias the line tension plunger to selectable engagement with the line.

12. The method of claim 11, further comprising:

guiding the line from the reel to the rod when the line is cast or retracted.

* * * * *